United States Patent
Marlin et al.

(10) Patent No.: US 10,375,187 B1
(45) Date of Patent: Aug. 6, 2019

(54) SUICIDE AND ALARMING BEHAVIOR ALERT/PREVENTION SYSTEM

(71) Applicants: Todd Jeremy Marlin, Pleasantville, NY (US); Marisa Marlin, Pleasantville, NY (US)

(72) Inventors: Todd Jeremy Marlin, Pleasantville, NY (US); Marisa Marlin, Pleasantville, NY (US)

( * ) Notice: Subject to any disclaimer, the term of this patent is extended or adjusted under 35 U.S.C. 154(b) by 13 days.

(21) Appl. No.: 15/969,482

(22) Filed: May 2, 2018

Related U.S. Application Data

(60) Provisional application No. 62/620,645, filed on Jan. 23, 2018.

(51) Int. Cl.
| | |
|---|---|
| *G06F 17/27* | (2006.01) |
| *G10L 15/18* | (2013.01) |
| *G10L 15/22* | (2006.01) |
| *H04L 29/08* | (2006.01) |
| *H04W 4/021* | (2018.01) |
| *G06F 16/9535* | (2019.01) |

(52) U.S. Cl.
CPC .......... *H04L 67/22* (2013.01); *G06F 16/9535* (2019.01); *G06F 17/2705* (2013.01); *G06F 17/2735* (2013.01); *G10L 15/1822* (2013.01); *G10L 15/22* (2013.01); *H04L 67/306* (2013.01); *H04W 4/021* (2013.01)

(58) Field of Classification Search
CPC .......... H04L 63/30–308; H04W 4/021; H04W 4/02; H04W 4/023; H04W 4/80; H04W 4/027; H04W 4/029; H04W 64/00; H04W 64/003; H04W 4/21; H04W 68/00; H04W 76/50
See application file for complete search history.

(56) References Cited

U.S. PATENT DOCUMENTS

| | | | | |
|---|---|---|---|---|
| 2006/0240803 A1* | 10/2006 | Valeriano | ................ | H04L 41/06 455/412.1 |
| 2007/0282623 A1* | 12/2007 | Dattorro | ................ | G06Q 10/00 709/225 |
| 2011/0113086 A1* | 5/2011 | Long | ..................... | G06Q 10/10 709/203 |
| 2011/0113096 A1* | 5/2011 | Long | ..................... | G06Q 30/02 709/204 |
| 2014/0195933 A1* | 7/2014 | Rao DV | ............... | H04L 51/046 715/758 |

(Continued)

*Primary Examiner* — David R Lazaro

(57) ABSTRACT

A method and system for monitoring an individual through his or her interactions with a user computing device. The method includes monitoring the user computing device for interactive activity data with a remote server. The interactive activity data is then parsed to identify an at least one erratic behavior datum, wherein the erratic behavior datum meets a criterion from risk-behavior criteria. The risk-behavior criteria are set by an administrative account and other external entities. If the erratic behavior datum is identified, then contextual data associated with the erratic behavior datum is extracted from the interactive activity data for provide additional descriptive information to the administrative account for review. Finally, a notification alert is sent from the remote server to an administrative computing device for review. The notification alert includes the erratic behavior datum and the associated contextual data.

18 Claims, 16 Drawing Sheets

(56) References Cited

U.S. PATENT DOCUMENTS

| | | | | |
|---|---|---|---|---|
| 2014/0308977 | A1* | 10/2014 | Cheung | H04W 4/021 |
| | | | | 455/456.3 |
| 2014/0368601 | A1* | 12/2014 | deCharms | H04W 4/021 |
| | | | | 348/14.02 |
| 2015/0112694 | A1* | 4/2015 | Blake | G06F 19/3431 |
| | | | | 705/2 |
| 2015/0189089 | A1* | 7/2015 | Iltus | H04M 3/4286 |
| | | | | 379/266.06 |
| 2015/0220697 | A1* | 8/2015 | Hunt | G16H 50/30 |
| | | | | 705/2 |
| 2015/0271638 | A1* | 9/2015 | Menayas | H04W 4/021 |
| | | | | 455/456.3 |
| 2015/0350233 | A1* | 12/2015 | Baxley | H04W 4/90 |
| | | | | 726/1 |
| 2016/0078149 | A1* | 3/2016 | Gaucher | G06F 17/30684 |
| | | | | 704/235 |
| 2016/0242143 | A1* | 8/2016 | Lotter | G06F 21/552 |
| 2016/0321243 | A1* | 11/2016 | Walia | G06F 17/271 |
| 2018/0041532 | A1* | 2/2018 | Johnson | H04L 63/1433 |
| 2018/0096587 | A1* | 4/2018 | Erman | G08B 25/016 |
| 2018/0113987 | A1* | 4/2018 | Zhu | G16H 50/30 |
| 2018/0165936 | A1* | 6/2018 | Smith | G06F 11/30 |
| 2018/0176727 | A1* | 6/2018 | Williams | H04L 63/20 |
| 2018/0198789 | A1* | 7/2018 | Liu | H04L 63/10 |

\* cited by examiner

SUICIDE AND ALARMING BEHAVIOR ALERT/PREVENTION SYSTEM

The current application claims a priority to the U.S. Provisional Patent application Ser. No. 62/620,645 filed on Jan. 23, 2018.

FIELD OF THE INVENTION

The present invention relates generally to a method for a monitoring system for digital and online safety as well as physical and mental wellbeing. More specifically, the present invention is a monitoring protocol which allows a caregiver or parent to monitor a child, sick, elderly, disabled person for suicidal, former addict or substance abusers, and teens for abnormal and or divergent behavior in general as well as the divergent behavior that could affect the individual being monitored. This is accomplished by monitoring the activity of the individual on an at least one computing device such as a smartphone, personal computer, laptop, tablet, and gaming system or any internet connected device. Additionally, the present invention may be used by schools, private schools, hospitals, corporations, governments agencies, and various military branches.

BACKGROUND OF THE INVENTION

Presently, the practice of monitoring an individual is conducted through the direct observation of the individual by a caregiver or a parent where both must be in the presence of each other or elsewise reliant on lesser fidelity analysis of the individual's viewing habits, contextual information given by their environments, and so on. Modern parental control applications instead focus on shutting applications on or off instead of monitoring for divergent or harmful behavior. The present invention remedies this by monitoring an at least one computing device of the individual and alerting the caregiver or parent of any abnormal or divergent behavior. More specifically, the present invention is implemented as an application running on the individual's computing device and is executed in the background, hidden from the individual to the extent systems allow. The present invention monitors in order to provide the caregiver or parent with viewing habits, voice, geolocation, and even whether the application has been tampered with. The information is simultaneously matrixed to a local behavior dictionary of divergent behavior, where such divergent behavior is differentiated or abridged from a master codex of divergent behavior and terms at a remote server embodied through an additional database or elsewise performed through machine learning or other forms of algorithmic analysis. The behavior information is cataloged as recorded data across a set interval and analyzed simultaneously or thereafter. Based on the preferences and settings set forth by the caregiver or parent, if no divergent behavior is detected the behavior information may be either saved by the remote server or deleted. Elsewise, the present invention notifies the caregiver or parent such that an appropriate response may be taken. There may also be an initial flag that is marked for divergent behavior that is then further tested server side through analytics, artificial intelligence, or machine learning. The present invention notifies the caregiver or parent should the child wander into a liquor store the geolocational element would note the dangerous and divergent behavior of the child (or even a recovering alcoholic) and alert a parent (or second party), or if the child notes they will meet a stranger at a certain location the application will note the unusual behavior outside of their known friends through parsing or machine learning or similar analytical techniques. Or if the child begins to reduce their social activity unexpectedly, the present invention will note such a social withdrawal. In another instance, the present invention possess means to operate across all language mediums and would be capable of capturing the keystrokes of the child even if they should rescind their initial statement, noting any perturbations, aggressiveness, or divergent behaviors outside the average operation of the child, of which the present invention would take note of and alert the pertinent parents, or other second parties archived in the registration phase. The various triggers and red flags monitored by the present invention may be customizable and entered by the caregiver or parent; including custom behaviors, locations of concern, contacts etc. The invention also optionally contains an opportunity to surface samples of never seen before behavior for the parent to classify as divergent or not and the results can be added to the dictionaries and models. Further, the invention also captures various data points related device interaction (locks, app usage, duration, hesitation, keystroke timing etc) to be used in algorithms to model different behaviors of concern.

DETAIL DESCRIPTIONS OF THE INVENTION

All illustrations of the drawings are for the purpose of describing selected versions of the present invention and are not intended to limit the scope of the present invention.

Figure 1:
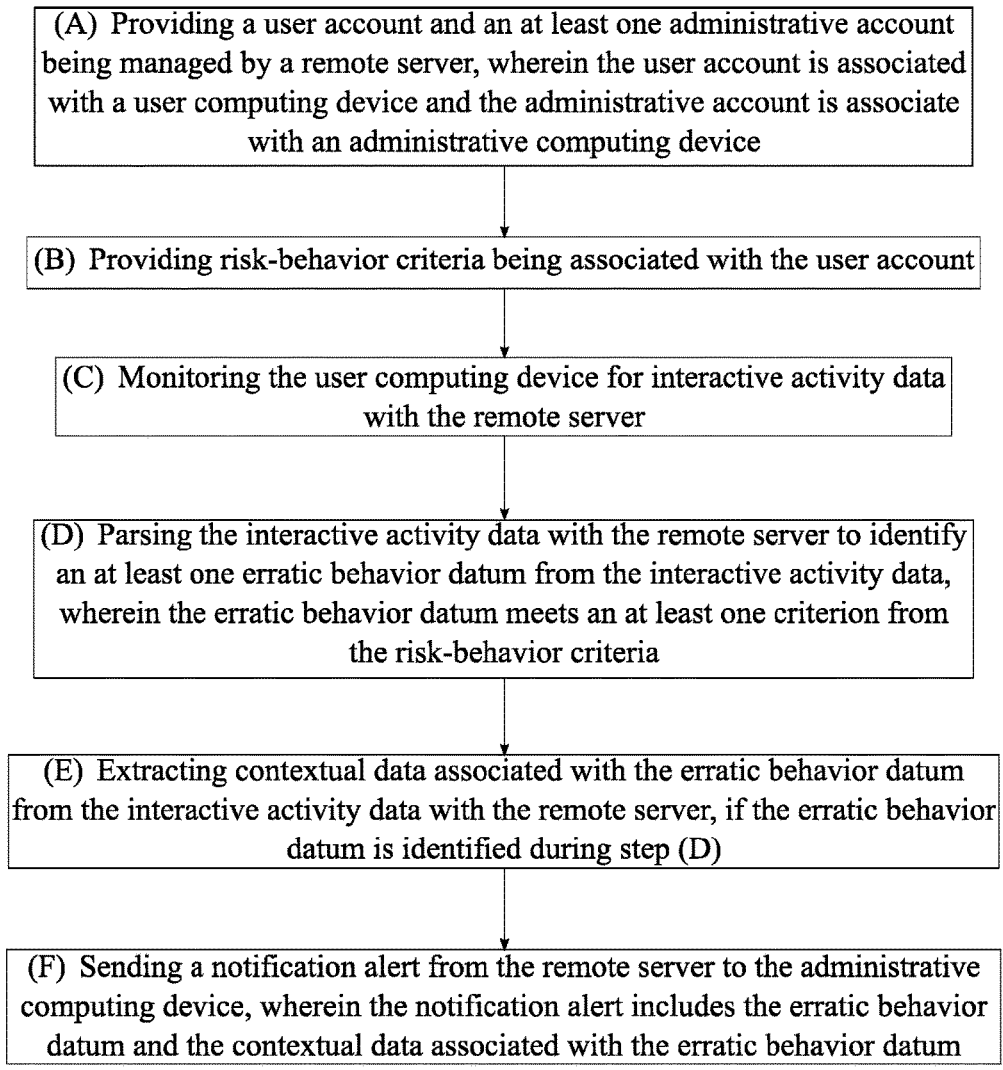
FIG. 1 is a flowchart depicting the overall process of the present invention.
Figure 16:
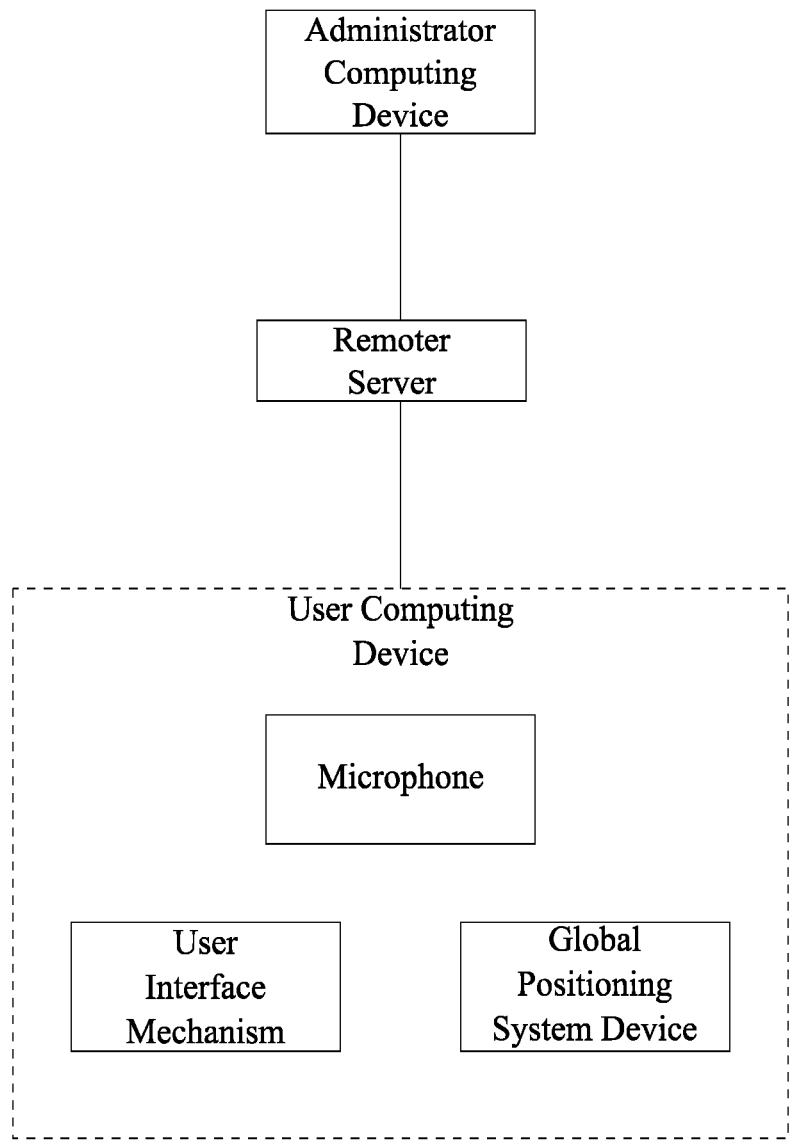
FIG. 16 is schematic diagram of the present invention.

In reference to FIG. 1 and FIG. 16, the present invention is generally a method and system for monitoring and archiving an at least one individual for unhealthy and potentially dangerous behaviors. More specifically, the present invention monitors said individual for mental health status and physical health status.

The present invention comprises a system and a method. The system comprises the physical components necessary to execute the various steps and functions of the present invention. The method comprises a set of steps executed by the system to necessary to monitor an individual for various divergent/unhealthy behaviors. The present invention is designed for caregivers, parents, and other similar personnel to discretely monitor a patient's, adult's, or child's activities on a computing device such as a smartphone or any internet-capable device. In general, the present invention monitors an individual's activity on a computing device to identify dangerous behavior, unhealthy behavior, and other at-risk behavior by comparing said activity content against various unhealthy and at-risk criteria.

Figure 15:
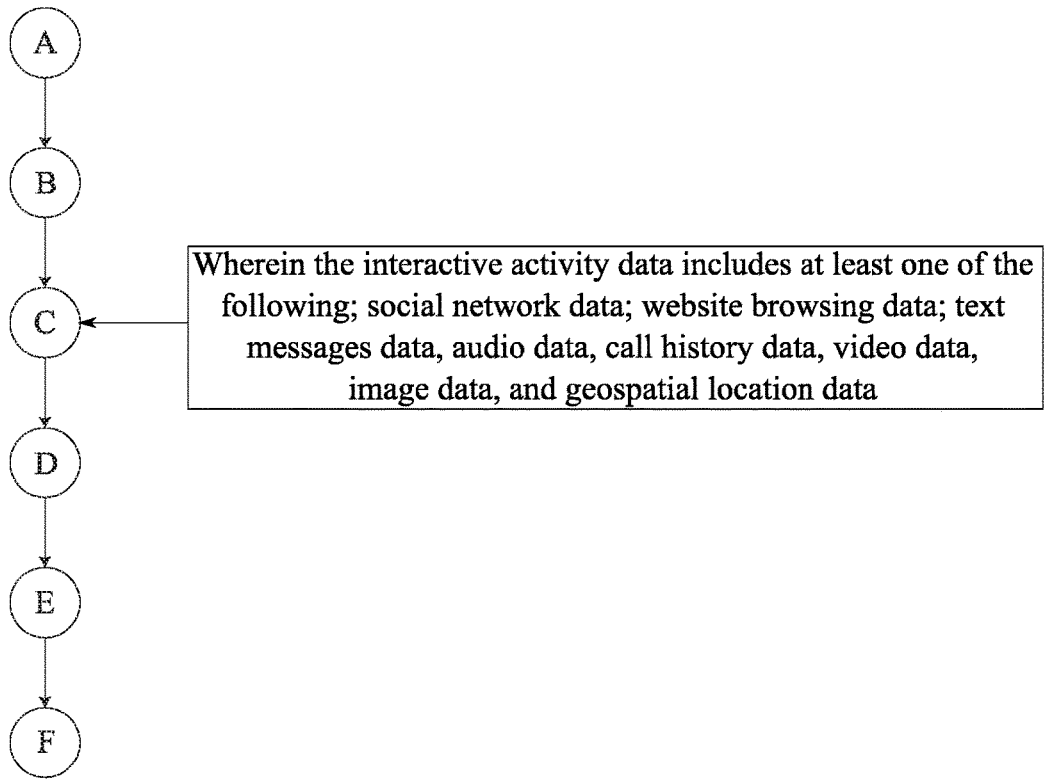
FIG. 15 is a flowchart depicting the various type of data that may be included in the interactive activity data.

The present invention includes an at least one user account and an at least one administrative account being managed by a remote server, wherein the user account is associated with an at least one user computing device and the administrative account is associated with an administrative computing device (Step A). The remote server stores and manages the various information gathered, processed, and stored by the present invention. Type of devices that may be used as the user computing device and the administrative computing device include, but are not limited to, laptops, smartphones, tablets, cell phones, desktop computers, and other similar devices. For optimal coverage, the present invention is preferably implemented on a variety of devices used by the monitored individual. This provides the caregiver/parent a comprehensive overview of the monitored individual's activities. To identify at-risk and unhealthy behaviors, the present invention includes risk-behavioral criteria associated with the user account (Step B). The risk-behavioral criteria include a set of rules that identify or predict specific unhealthy, risky, or otherwise divergent behavior from normal behavior. Additionally, the risk-behavioral criteria include a variety of information that is deemed, preset, or otherwise known to be associated with specific unhealthy or risky behavior. In general, the risk-behavioral criteria are used as a measuring tool to evaluate the monitored individual's social activity, mood, social media posting, physical location, and other similar content. The risk-behavioral criteria may include a list of words or phrases associated with violence such as "gun", "attack", and "knife". Additionally, the risk-behavioral criteria may also include other types of content such as images, vocal tones, geospatial locations, memes, and emojis to name a few non-limiting examples. Referring to FIG. 15, furthermore, type of risk-behavior criteria may also include at least one of the following (but not limited to): suicide criterion, self-harm criterion, anxiety criterion, drugs and alcohol abuse criterion, harassment criterion, blackmail criterion, internet addiction criterion, stranger interaction criterion, prostitution criterion, terrorism criterion, depression criterion, violence criterion, substance abuse criterion, gambling criterion, racism, harassment, sexual activity criterion, and physical danger criterion.

Referring to FIG. 1, the overall process of the present invention begins with monitoring the user computing device for interactive activity data with the remote server (Step C). In an alternative embodiment, the interactive activity data is recorded by the user computing device. The interactive activity data is any data processed, received, entered, sent, stored, or passed through the user computing device. More specifically, the interactive activity data may include one or more of the following: social network data; website browsing data; device lock and unlock data; device interaction with other computing devices; data for applications installed on the user computing device; text messages data; audio data; call history data; video data; image data; and geospatial location data. The interactive activity data is then processed and analyzed in order to identify possible flags associated with divergent or unhealthy behavior. More specifically, the interactive activity data is parsed with the remote server to identify an at least one erratic behavior datum from the interactive activity data, wherein the erratic behavior datum meets an at least one criterion from the risk-behavior criteria (Step D). The erratic behavior datum is a piece of information from the interactive activity data that is, according to the risk-behavior criteria, an anomaly or an inconsistency with normal and healthy behavior. For the present invention, datum refers to any one piece of information, regardless of size or context, wherein said piece of information may be stored, viewed, utilized, and recorded in a variety of forms. For example, datum may refer to a name, place, geospatial location, text, image, audio recording, phrase, word, tone, frequency, or number to name a few non-limiting examples. In alternative embodiments of the present invention, the interactive activity data may be parsed/analyzed by the user computing device, the administrative computing device, or any other computing device. If the erratic behavior datum is identified, then additional context information is obtained pertaining to said erratic behavior datum. In particular, the remove server extracts contextual data associated with the erratic behavior datum from the interactive activity data if the erratic behavior datum is identified during Step D (Step E). The contextual data includes metadata associated with the erratic behavior datum. Metadata includes, but is not limited to, time, geospatial location, contact information for conversations, name(s), date, conversation context, and other information that describe the circumstances for the erratic behavior datum. This allows for a more accurate assessment and understanding of the situation that caused or lead up to the erratic behavior datum. Location and time information may be used to locate the monitored individual to provide aid in case he or she is in physical danger; for example, if he or she is having suicidal thoughts. In other cases, the contextual data provides a means for identifying false alerts; this is the case if the erratic behavior datum was part of a joke or a misspelling error.

Figure 2:
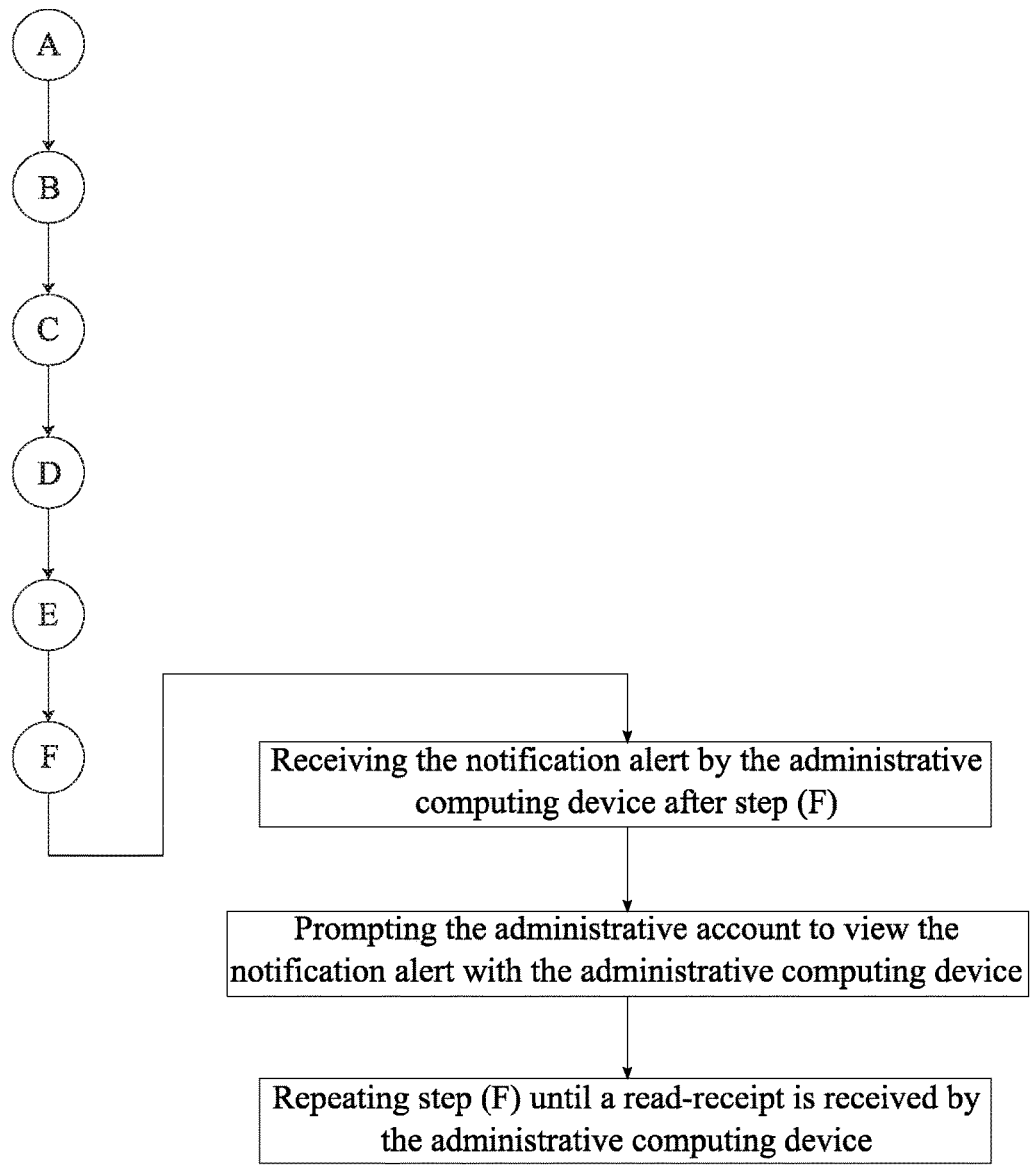
FIG. 2 is a flowchart depicting the subprocess for continuously sending a notification alert to the administrator computing device until a read-receipt is received by the administrator computing device.

Once the contextual data is extracted, a notification alert is sent from the remote server to the administrative computing device; wherein the notification alert includes the erratic behavior datum and the contextual data associated with the erratic behavior datum (Step F). The notification alert provides the administrative account with all the gathered information relating to the erratic behavior datum, thus allowing the caregiver or parent to act accordingly. The present invention instantly notifies the caregiver or parent of irregular behavior in the monitored individual, thus allowing for timely action to be taken before any physical danger occurs to the monitored individual. Referring to FIG. 2, to further ensure that help is received by the monitored individual in a timely manner, the present invention repeatedly and continuously alerts the administrative account (and other designated contacts) until the caregiver or parent views said alert notification. More specifically, the administrative computing device receives the notification alert during Step (F) and, then, prompts the administrative account to view the notification alert with the administrative computing device. Step F is repeated until a read-receipt is received by the administrative computing device, showing that administrative account viewed the notification alert.

Regardless of the erratic behavior datum being identified, the present invention may be set to send periodic reports (daily, hourly, weekly) regarding the interactive activity data or regarding specific categories or specific aspects of the interactive activity data. Additionally, the administrative account may customize the present invention to his or her specific needs and preferences. In particular, the administrative account may activate or deactivate specific criterion from the at-risk behavior criteria; and, add and or modify aspects of any from the at-risk behavior criteria.

Figure 3:
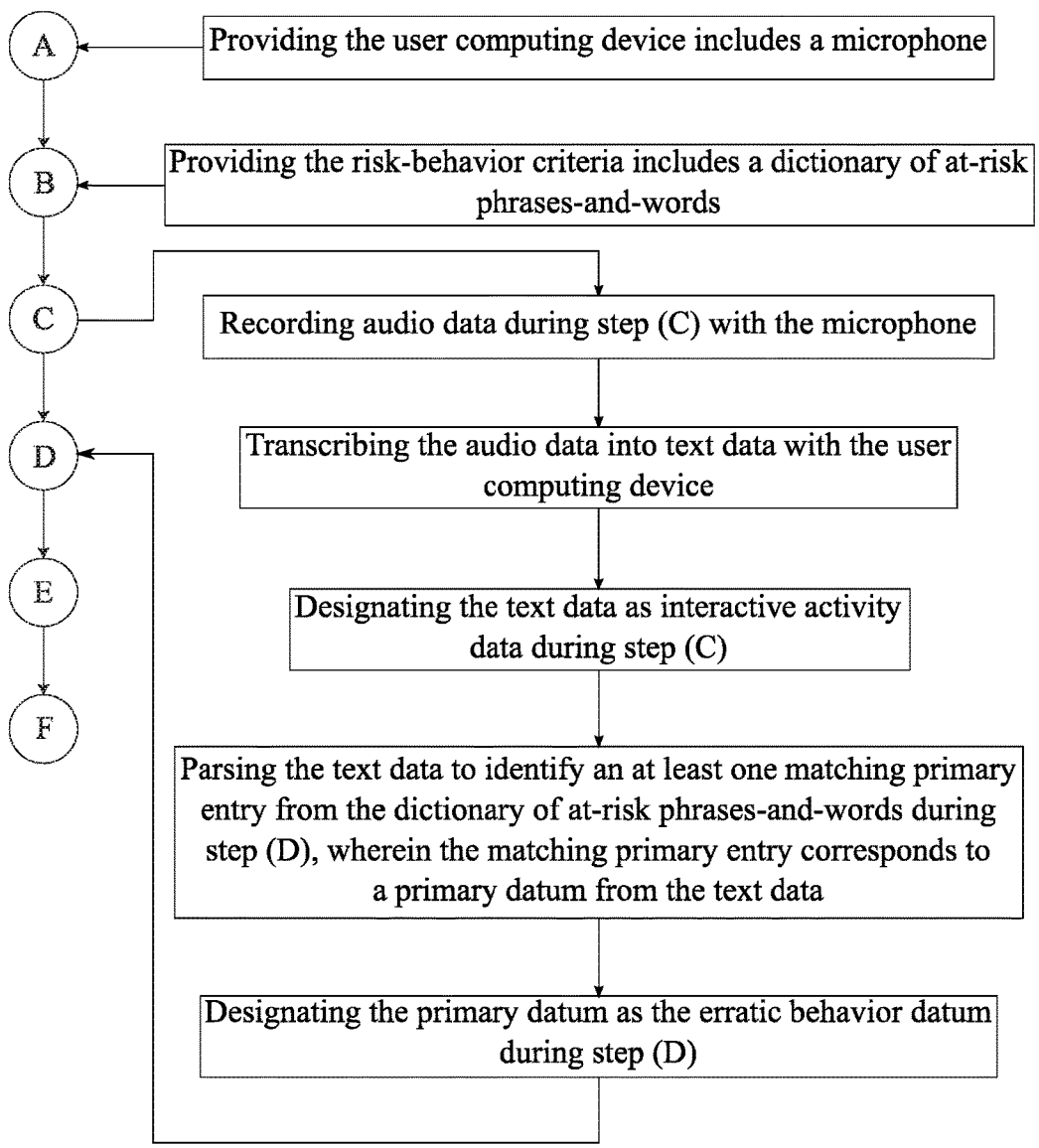
FIG. 3 is a flowchart depicting the subprocess for recording and analyzing audio data with the user computing device, in particular with a microphone.

Referring to FIG. 3, one type of information that the present invention monitors is audio from the user computing device. For this feature, the user computing device includes a microphone. Additionally, the risk-behavior criteria include a dictionary of at-risk phrases-and-words. Examples of entries within the dictionary of at-risk phrases-and-words include, but are not limited to, "I want to kill myself", "suicide", "kill", "fight", "gambling", "anxiety", "stress", "headache", and "sick". Furthermore, the dictionary of at-risk phrases-and-words may include negative language such as profanity, violent language, joking or sarcastic language, and sexually graphic language in reference to an at least one person. This type of language indicates active or passive bullying, a behavior the present invention is designed to monitor and identify. In general, the dictionary of at-risk phrases-and-words cover a wide range of social, mental, and physical characteristics. In relation to the overall process of the present invention, audio data is recorded during Step C with the microphone. The audio data includes spoken words, noise, or any other sound uttered into and or around the microphone, regardless if the monitored individual is using the microphone or not. The audio data is then transcribed into text data with the user computing device such that the text data may be analyzed against the at-risk behavior criteria, more specifically against the dictionary of at-risk phrases-and-words. In particular, the text data is designated as the interactive activity data during Step C. Then, during Step D, the text data is parsed to identify an at least one matching primary entry from the dictionary of at-risk phrases-and-words, wherein the first matching primary entry corresponds to a primary datum from the text data. This includes identifying any number of entries or any combination of entries in any order, combination, or form from the dictionary of at-risk phrases-and-words. The primary datum is then designated as the erratic behavior datum during Step D such that the associated contextual data for the primary datum may be extracted, analyzed, and conveyed to the administrative account.

Figure 4:
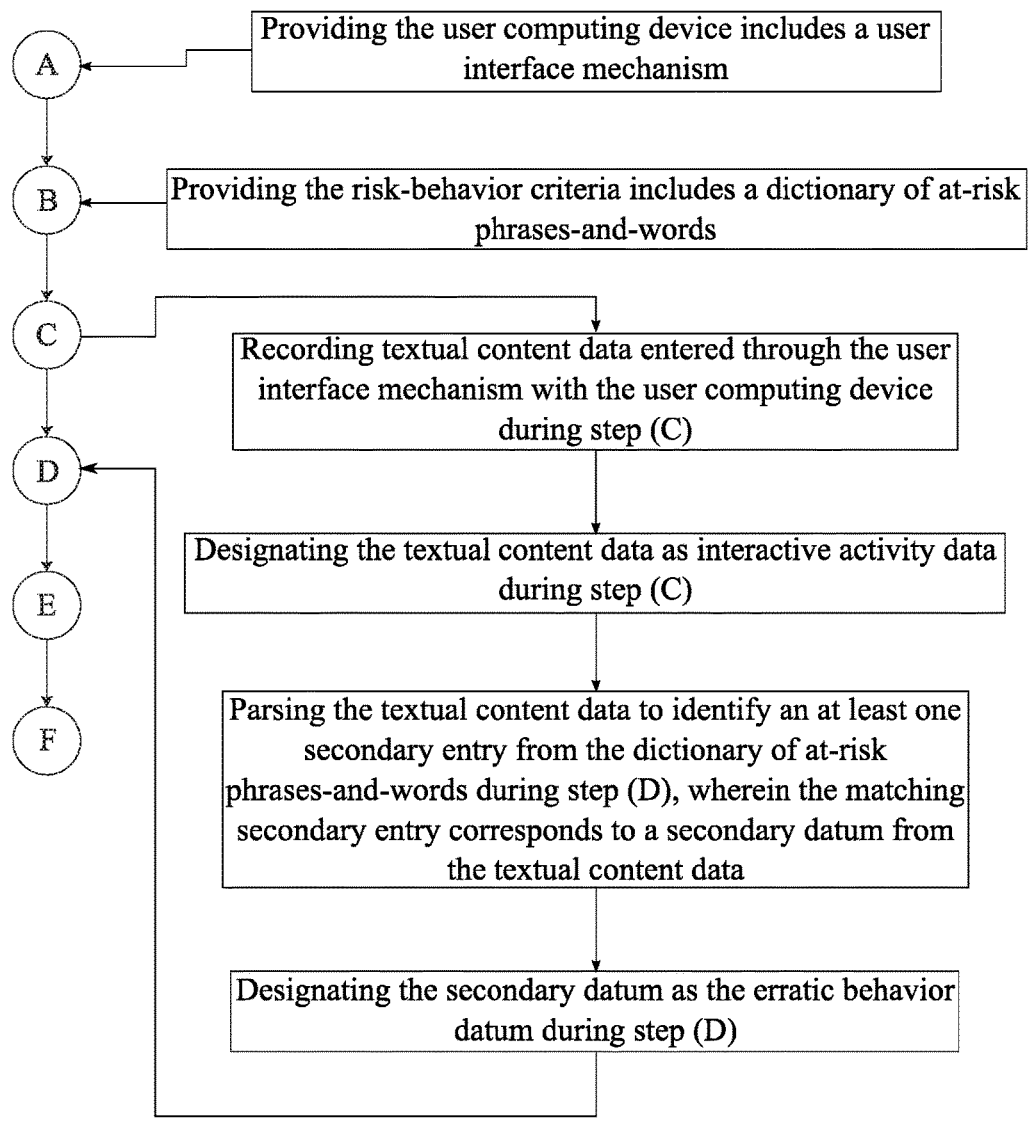
FIG. 4 is a flowchart depicting the subprocess for recording and analyzing textual content data with the user computing device, in particular with a user interface mechanism.

Referring to FIG. 4, another type of information that the present invention monitors is any type of input received by the user computing device. For this feature, the user computing device includes a user interface mechanism. Type of devices and mechanisms that may be used as the user interface mechanism include, but are not limited to, an electronic mouse, a touch screen, a keyboard, and a touchpad. In general, information obtained from the user interface mechanism is used to monitor entered text into the user computing device, regardless whether said text was sent or used in a message, email, or browser. This allows the present invention to obtain a glimpse into the thoughts and behaviors of the monitored individual as information that is typed repeatedly but isn't posted or sent directly conveys internal feelings and thoughts. To analyze this type of information, the at-risk phrases-and-words are utilized again. In particular, during Step C, textual content data entered through the user interface mechanism is recorded with the user computing device. Type of textual content data includes, but is not limited to, text messages, social media content, information entered for a website, user computer commands, word and other similar document data, and other similar content. The textual content data is then designated as the interactive activity data during Step C during the overall process of the present invention. Next, the textual content data is parsed by the remote server during step D to identify an at least one matching secondary entry from the dictionary of at-risk phrases-and-words, wherein the matching secondary entry corresponds to a secondary datum from the textual content data. Finally, the secondary datum is designated as the erratic behavior datum during step D such that the associated contextual data for the secondary datum may be extracted, analyzed, and conveyed to the administrative account. Additionally, the present invention tracks and monitors the various logins and screennames used by the monitored individual for applications and websites. Anytime a new login or screenname is used or set up for a website or social media, this is identified as divergent behavior and the alert notification is sent to the administrative account. Furthermore, the present invention monitors and notifies in case any new accounts are set up on the user computing device and or in case any new applications are installed.

Figure 5:
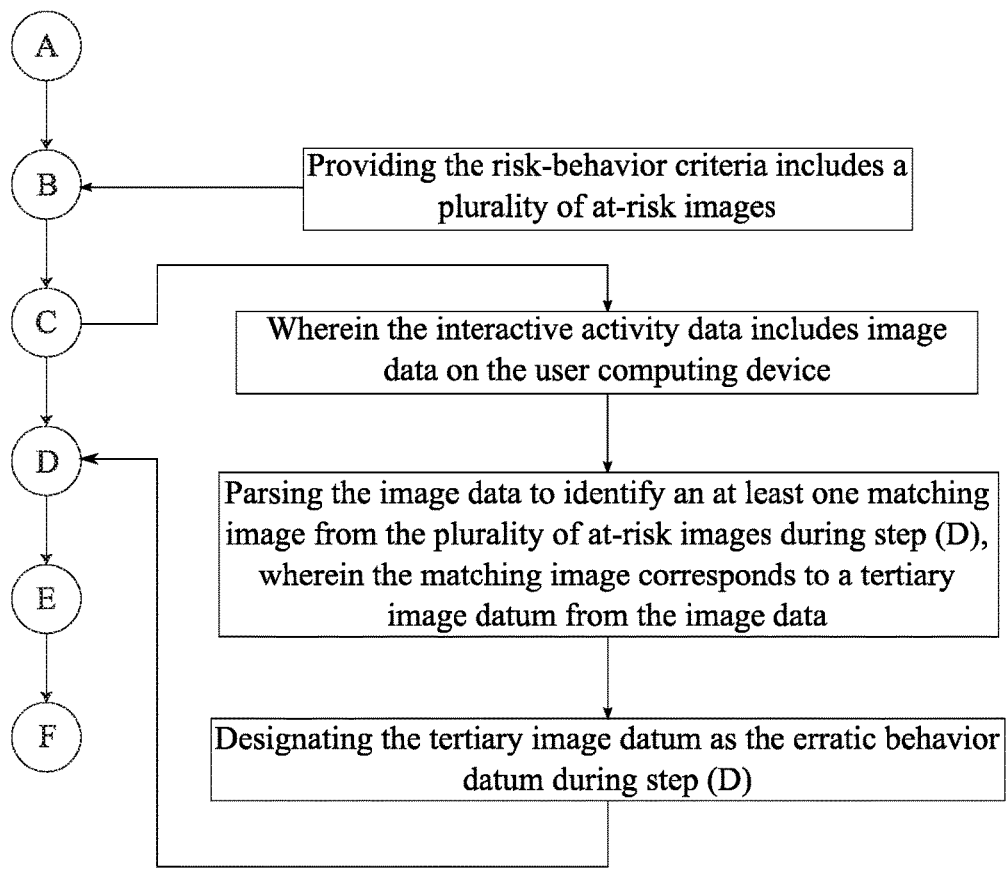
FIG. 5 is a flowchart depicting the subprocess for identifying and analyzing image data stored, sent, and received by the user computing device.

Referring to FIG. 5, another type of information that the present invention monitors is video and image information stored on, taken, sent, received, or recorded by the user computing device. For this feature, the user computing device preferably includes a camera. Additionally, the risk-behavior criteria include a plurality of at-risk images. The plurality of at-risk images includes a wide array of pictures, graphic items, graphic indicators, graphic gestures, graphic actions, and any other pertinent visual entries. In general, each of the plurality of at-risk images is in one way or another associated with or known to correlate with at-risk or unhealthy behaviors such as violence, nudity, prostitution, and gambling. Furthermore, for this feature, the interactive activity data includes image data on the user computing device. In relation to the overall process of the present invention, the image data is first graphically parsed to identify an at least one matching image from the plurality of at-risk images during step D, wherein the matching image corresponds to a tertiary image datum from the image data. Then, the tertiary image datum is designated as the erratic behavior datum during step D such that the associated contextual data for the tertiary datum may be extracted, analyzed, and conveyed to the administrative account.

Figure 6:
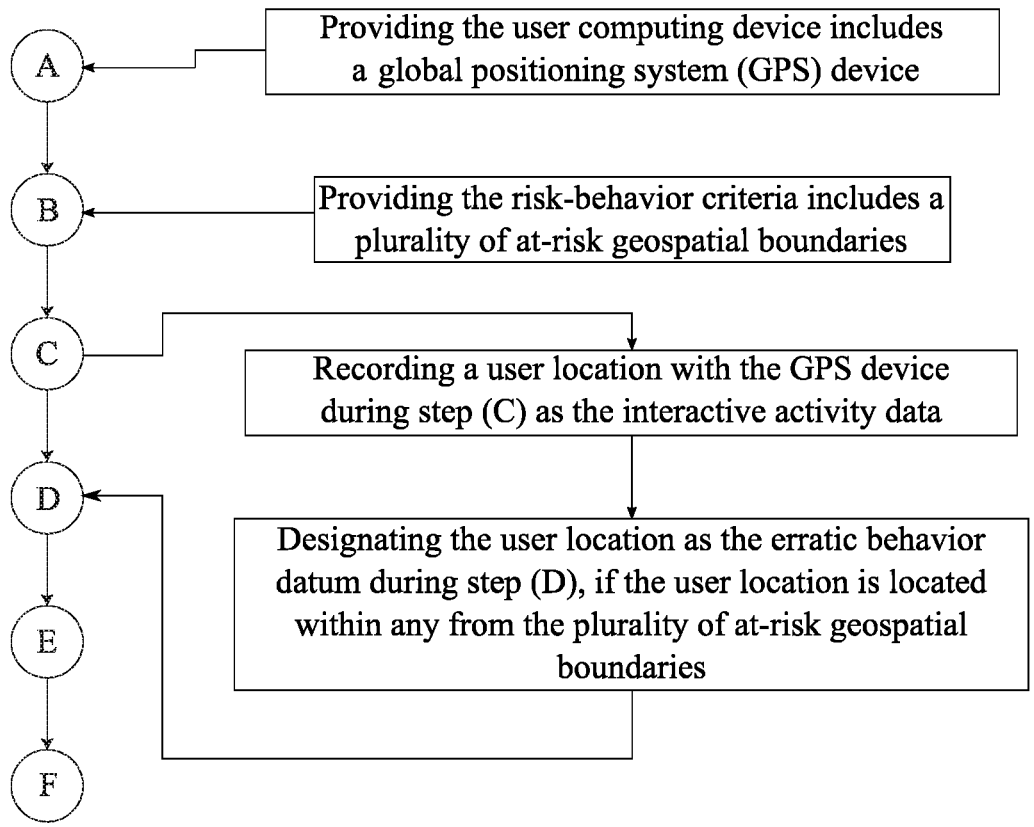
FIG. 6 is a flowchart depicting the subprocess for identifying the location of the use computing device through a global positioning system (GPS) device.

Referring to FIG. 6, another type of information monitored by the present invention is the physical location of the user computing device. For this feature, the user computing device includes a global positioning system (GPS) device. The GPS device records and provides a geolocation and time information anywhere on the planet based on an array of orbiting satellites. This allows the present invention to track the physical location of the monitored individual for quickresponse purposes in emergency situations and for ensuring that the monitored individual stays away from dangerous neighborhoods and illegal establishments, for example a liquor store for a teenager. For this, the risk-behavior criteria include a plurality of at-risk geospatial boundaries. Each of the plurality of at-risk geospatial boundaries outlines a physical location that is associated with unhealthy behavior, is a dangerous location, or an off-limit location preset by the administrative account. Additionally, the present invention may be tied with an external database that comprises dangerous locations deemed by a governing entity; such locations include, but are not limited to, liquor stores, gun stores, casinos, marijuana stores, adult stores, and adult entertainment establishments. In relation to the overall process of the present invention, a user location is recorded with the GPS device during Step C as the interactive activity data. The rate at which the user location is recorded may vary based on preset guidelines set forth by the administrative account. If at any point the user location is located within any from the plurality of at-risk geospatial boundaries, the user location is designated as the erratic behavior datum during Step D and the notification alert is sent to the administrative account for review. Resultantly, the caregiver or parent is capable of tracking the monitored individual's physical location in case he or she is in trouble, enters a bad neighborhood, gets lost in the woods, or steps into an unhealthy or dangerous establishment. For example, this allows a caregiver track and prevent an individual with a gambling problem from entering any establishment known for gambling and as such preventing a relapse and further unhealthy behavior.

Figure 7:
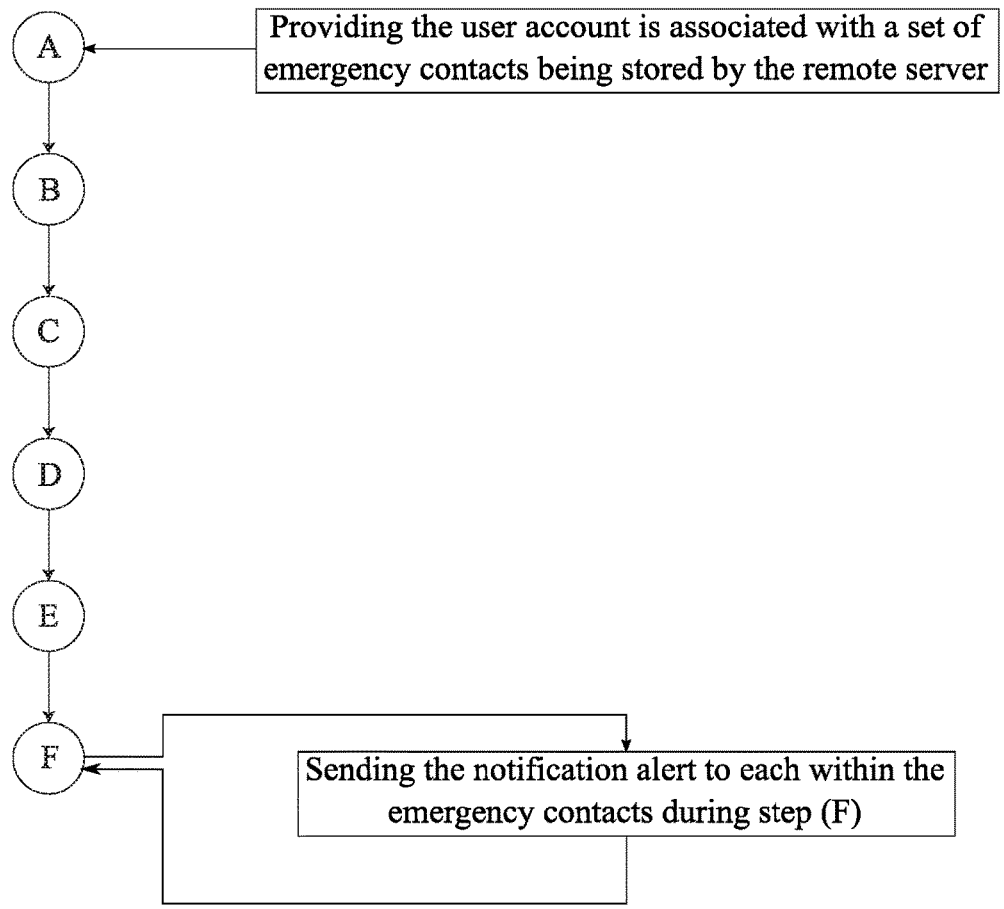
FIG. 7 is a flowchart depicting the subprocess for sending the alert notification to a set of emergency contacts.

Referring to FIG. 7, the present invention also provides a means of contacting a multitude of preset contacts in addition to the individual assigned to the administrative account. For this feature, the user account is associated with a set of emergency contacts prior to execution of the present invention. Any individual or group may be set as one of the set of emergency contacts including, but not limited to, a parent, a teacher, an instructor, a guardian, friends, family, police department, fire department, and other emergency response departments. Each within the set of emergency contacts includes a name, a phone number, an email address, relationship to the monitored individual, and any other necessary information. In relation to the overall process of the present invention, during Step F, the notification alert is sent to each within the set of emergency contacts. Furthermore, in other embodiments of the present invention, each of the at-risk behavior criteria is associated with a specific group within the set of emergency contacts and only the specific group associated with a triggered behavior criterion is contacted. This isolates the individuals contacted to only people directly capable of helping the monitored individual for the triggered behavior criterion, in general a more customized response. The specific group is preset by the administrative account. Additionally, the administrative account dictates who is contacted in regard to different at-risk behavior criterion.

Figure 8:
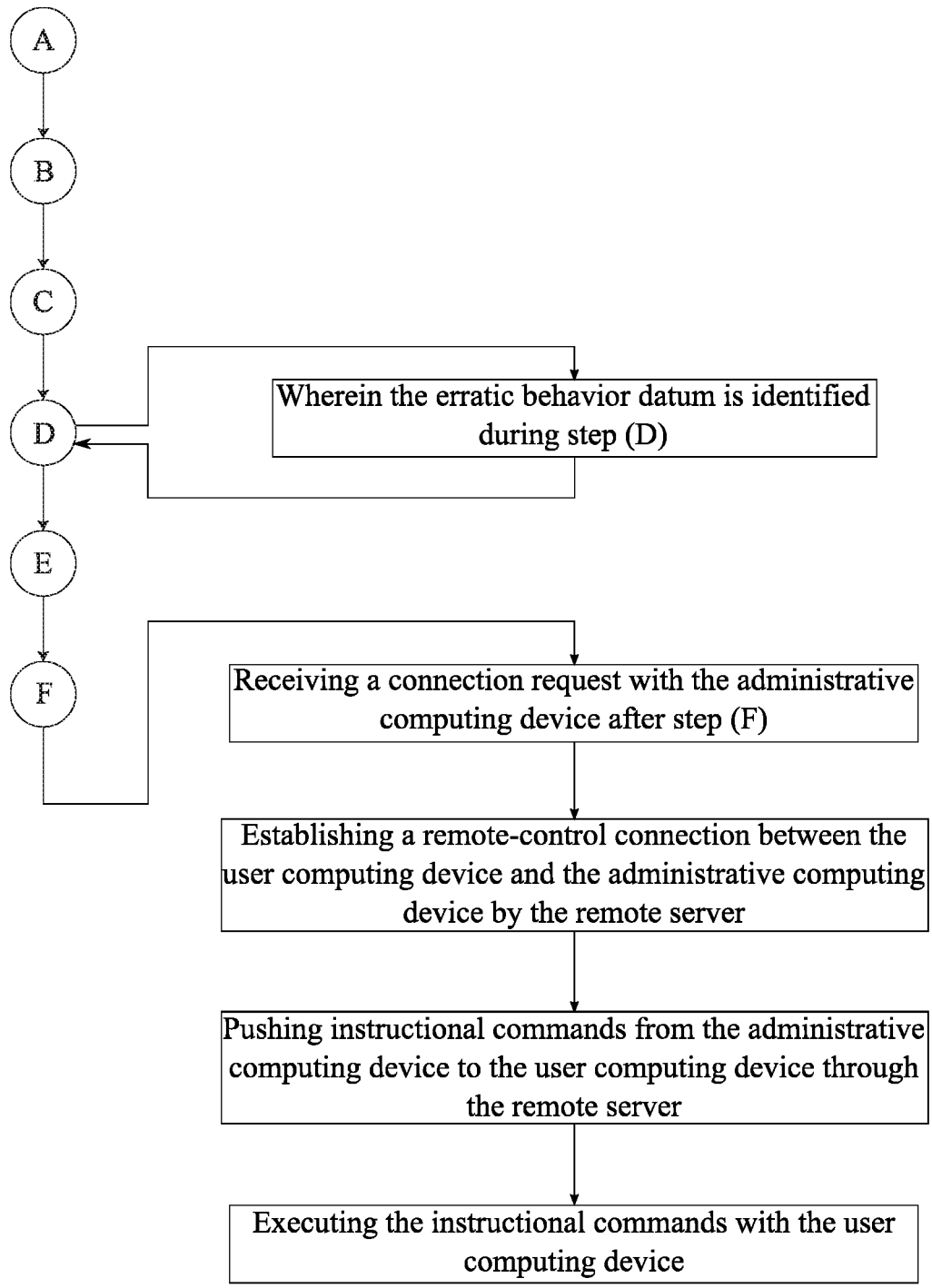
FIG. 8 is a flowchart depicting the subprocess for initiating and executing an automatic connection between the administrator computing device and the user computing device.

Referring to FIG. 8, the present invention provides an additional means of instantly helping the monitored individual through an initiated auto connection. In particular, the present invention allows the administrative account to request and initiate an instant connection with the user account regardless if the monitored individual consents or not to said connection. This allows the caregiver or parent to call or video-chat with the monitored individual instantly and provide help. In relation to the overall process, this feature is offered to the administrative account when the erratic behavior datum is identified during Step D. Once the erratic behavior datum is identified, the administrative account is provided with the option for an auto-connect. If a connection request is received with the administrative computing device, then a remote-control connection is established between the user computing device and the administrative computing device by the remote server; this occurs after Step F. Next, instructional commands from the administrative computing device are pushed to the user computing device through the remote server. In general, this provides the administrative account with access and control to the functions of the user computing device. Type of instructional commands include, but are not limited to, connecting to a phone call, connecting to a face-time chat, connecting to a video chat, closing an application, manipulating commands within an application, and other similar commands. In general, the monitored individual does not need to answer because the call will be automatically accepted. This is extremely helpful if the monitored individual is in reclusive state or is physically unable to answer a call. Additionally, the present invention allows the administrative account to manage various features and applications of the user computing device through the auto-connect feature. For example, the administrative account may facilitate setting a specific keyboard as default; delete the existing keyboard; prevent switching of keyboard; selecting a specific corporate application; and installing new applications to the user computing device.

Figure 9:
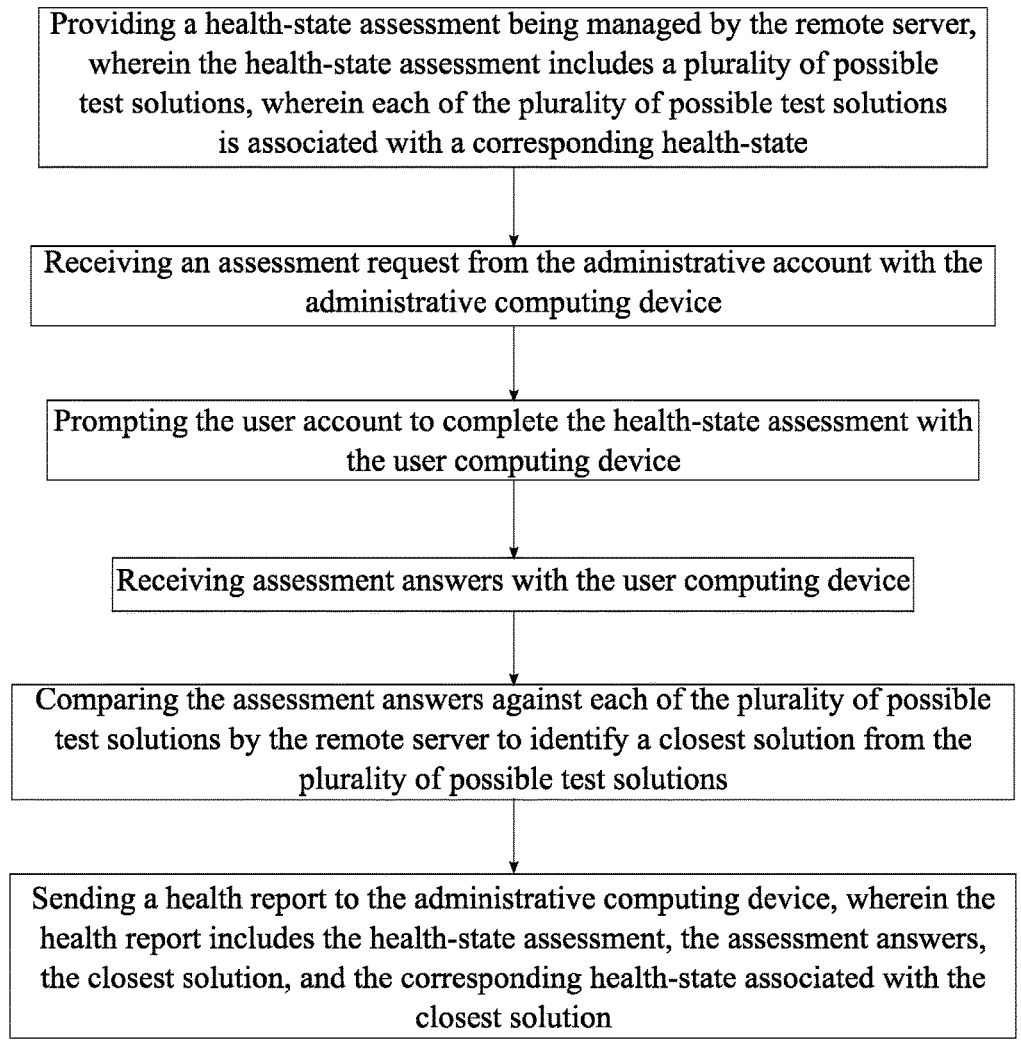
FIG. 9 is a flowchart depicting the subprocess for requesting, executing, and analyzing a health-state assessment for the user account.

Referring to FIG. 9, the present invention provides a means of testing and gauging the mental or physical state of the monitored individual through a requested assessment, a test. In particular, for this feature, the present invention is provided with a health-state assessment being stored and managed by the remote server, wherein the health-state assessment includes a plurality of questions and is associated with a plurality of possible test solutions. The plurality of questions is preset by the administrative account or picked from a set of standard questions and may include comprehensive technical ability, standard questions as spelling, entering one's name and other personal information, and any other field/subject indicative of one's mental or physical status. Additionally, this can include but is not limiting to typing certain things in a certain order in a certain time with a maximum amount of errors, common sense questions to test response time including images or not, etc. Furthermore, each of the plurality of possible test solutions is associated with a corresponding mental and physical state that provides the caregiver or parent with an insight to the well-being of the monitored individual. This option is available to the administrative account at any time. When an assessment request is received from the administrative account with the administrative computing device, the user account is instantly prompted to complete the health-state assessment with the computing device. In one embodiment, until the health-state assessment is completed, the monitored individual is locked out of any other functions of the user computing device. As the monitored individual completes the health-state assessment, assessment answers are received with the user computing device. The assessment answers are then compared against each of the plurality of solutions by the remote server to identify a closest solution from the plurality of test solutions. Once the closest solution is identified, then a health report is sent to the administrative computing device, wherein the health report includes the health-state assessment, the assessment answers, the closest solution, and the corresponding health-state associated with the closest solution. This provides the caregiver or parent with all the information necessary to determine the mental or physical state of the monitored individual and respond appropriately, if necessary. In one embodiment of the present invention, the health-state assessment is a mental-health assessment. The mental-health assessment checks the level of psychological well-being of the monitored individual. This allows the present invention to identify potential mental illnesses. More specifically, the mental-health assessment includes specific questions for identifying various mental illnesses such as anxiety, panic attacks, bipolar disorder, depression, and personality disorders to name a few non-limiting examples. Additionally, in another embodiment of the present invention, the health-state assessment is a physical-health assessment. The physical-health assessment reviews and checks the physical well-being of the monitored individual. This allows the present invention to identify potential physical problems and illnesses of the monitored individual including, but not limited to, level of sobriety, bulimia, and chronic diseases to name a few non-limiting examples.

In another embodiment, the present invention monitors and tracks potential physical problems. In particular, the present invention monitors and detects if the user computing device is on the floor, based on learning the typical height that the user computing device is held at, so as to determine if the user computing device is on the ground for longer than a predetermined amount of time. This is indicative of physical injury or a fall and is useful for children and the elderly.

Figure 10:
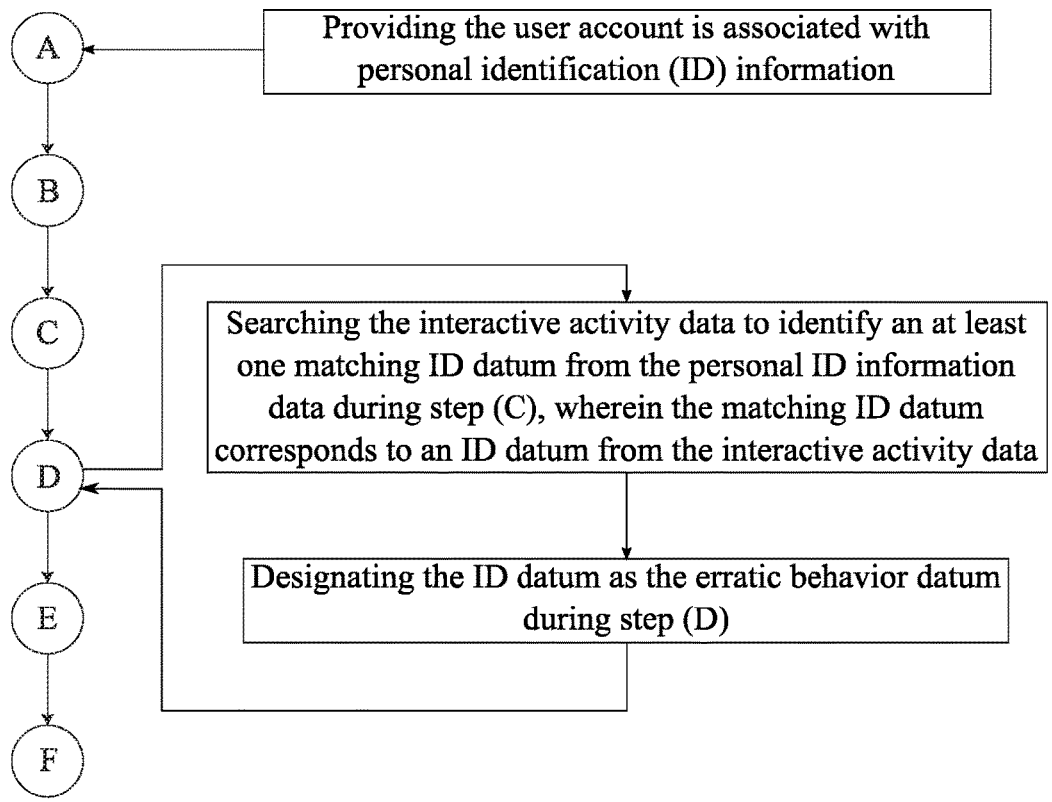
FIG. 10 is a flowchart depicting the subprocess for identifying the sharing of personal identification (ID) information through the user computing device.

Referring to FIG. 10, another red flag monitored by the present invention is the distribution of personal information of the user account. In general, the present invention monitors the sharing of personal information and the context around said sharing, to whom and why for example. For this feature, the user account is associated with personal identification (ID) information that is preloaded and preset by the administrative account. Type of information saved as the personal ID information includes, but is not limited to, birthday, address, phone number, grandparent's names, financial accounts, and social security number. During Step C, the remote server searches the interactive activity data to identify an at least one matching ID datum from the personal ID information, wherein the personal ID datum corresponds to an ID datum from the interactive activity data. If the matching ID datum is identified, then the ID datum is designated as the erratic behavior datum during Step D such that the associated contextual data for the ID datum may be extracted, analyzed, and conveyed to the administrative account. This signals to the caregiver or parent that the monitored individual shared personal ID information and the context around said sharing. The present invention may also utilize an additional algorithm to determine the reason for sharing said information while the contextual data associated with the ID datum may be used to identify to whom and when the ID datum was sent to.

Figure 13:
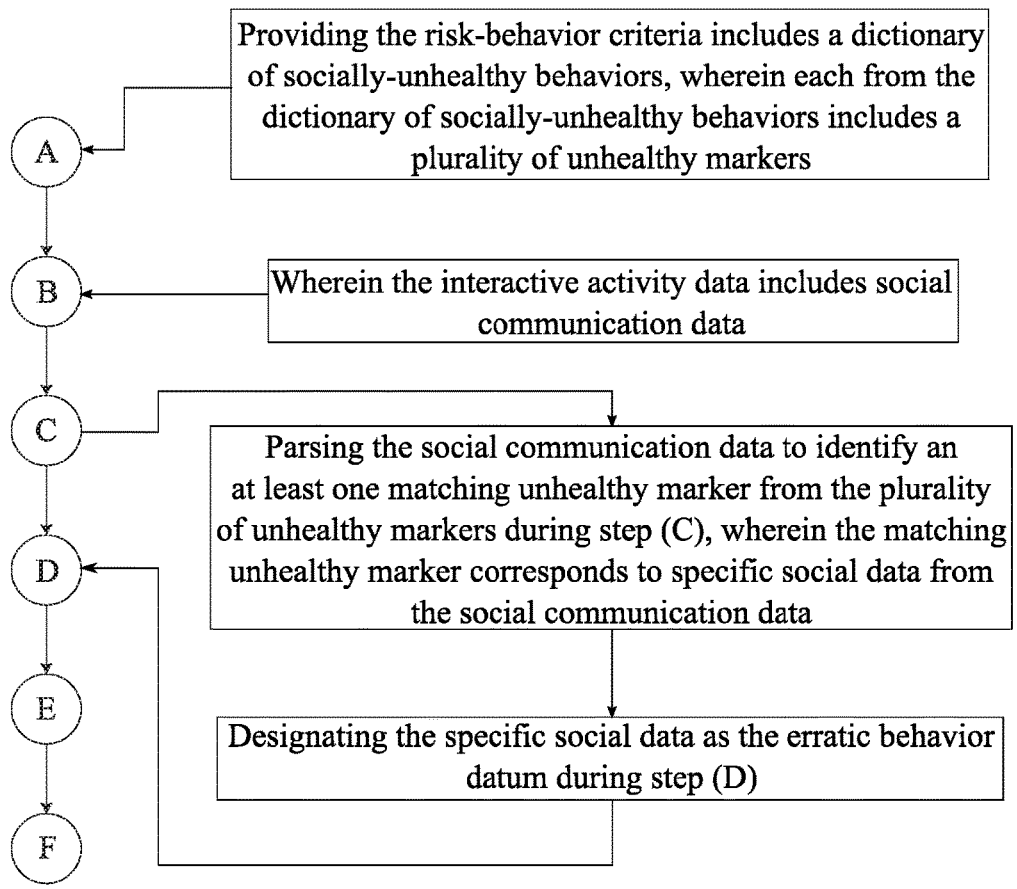
FIG. 13 is a flowchart depicting the subprocess for analyzing social interactions of the user account to identify socially-unhealthy behaviors.

Referring to FIG. 13, the present invention monitors all social interactions and communications. In particular, the interactive activity data includes social communications data from any messenger application, phone calls, emails, and any other means of communication through computing devices. For this, the risk-behavior criteria include a dictionary of socially-unhealthy behaviors, wherein each from the dictionary of socially-unhealthy behaviors further includes a plurality of unhealthy markers. Type of information that may be used as the plurality of unhealthy markers include, but are not limited to, negative language associated with people, violent language, language associated with digital bullying, aggressive language, and depressing language. During step C, the social communication data is parsed to identify an at least one unhealthy marker from the plurality of unhealthy markers; wherein the matching unhealthy marker corresponds to specific social data form the social communication data. If the matching unhealthy marker is identified, then the specific social data is designated as the erratic behavior datum during Step D such that the associated contextual data for the specific social data may be extracted, analyzed, and conveyed to the administrative account. This criterion looks for active and passive digital bullying, depression, and violent threats to name a few non-limiting examples. Additionally, the present invention monitors to identify when the monitored individual isn't employing digital manners and is not responding to friends (posts, texts, facetimes, and instagrams) with regularity or within expectations.

Figure 11:
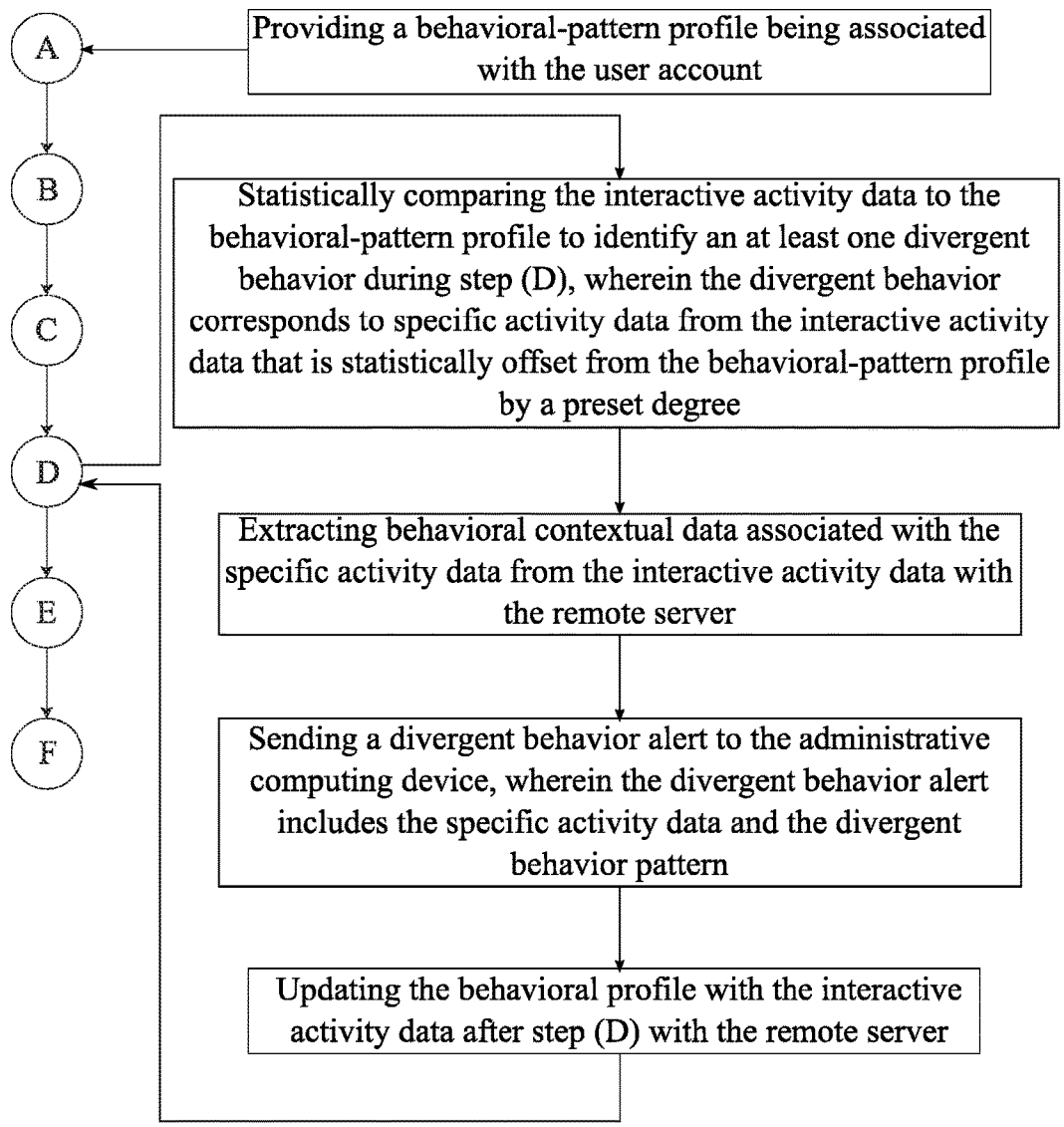
FIG. 11 is a flowchart depicting the subprocess for analyzing the interactive activity data of the user account for divergent behavior based on a behavioral-pattern profile.
Figure 12:
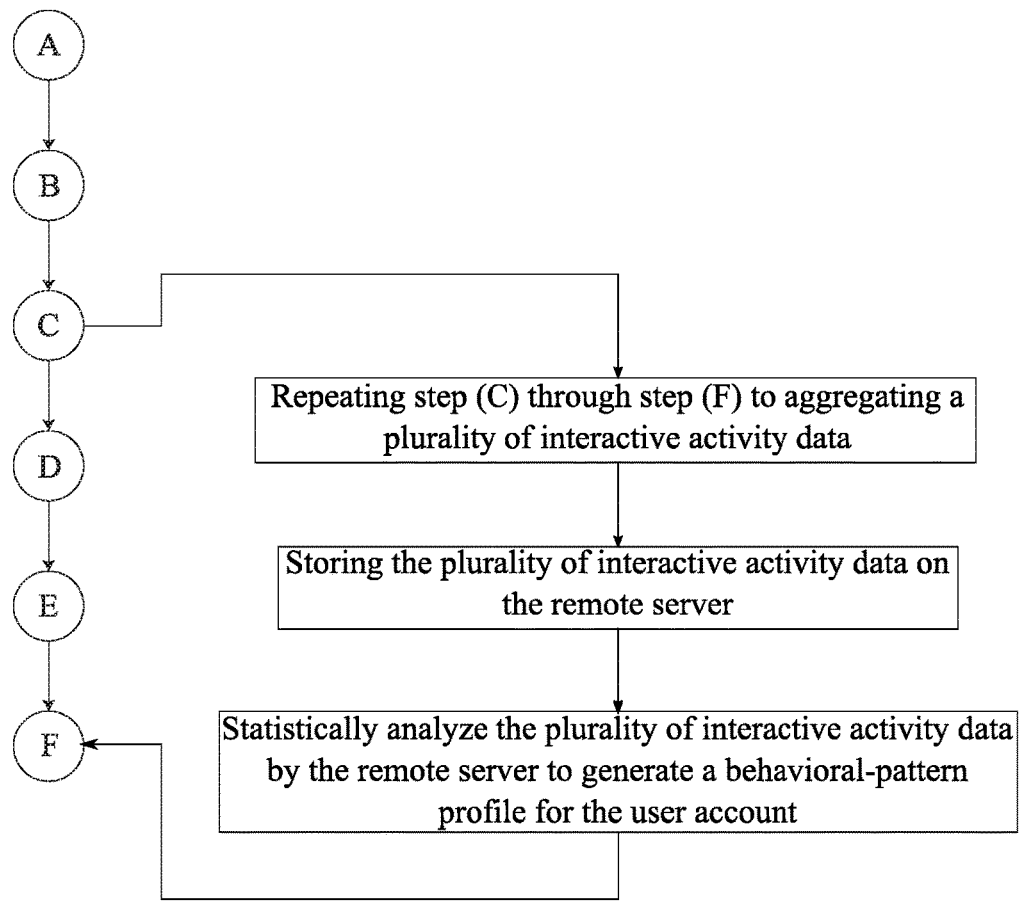
FIG. 12 is a flowchart depicting the subprocess for building and maintaining the behavioral-pattern profile.

Referring to FIG. 11 and FIG. 12, the present invention also utilizes machine learning to ensure that any and all divergent behavior is identified. Over a period of time, Step C through Step F are repeated over and over again to aggregate a plurality of interactive activity data. The period of time and number of repetition is subject to change based on the needs and preferences of the administrative account. The plurality of interactive activity data is stored on the remote server and delineates an overall behavior pattern of the monitored individual. To adequately utilize the plurality of interactive activity data, the plurality of interactive activity data is statistically analyzed by the remote server in order to generate a behavioral-pattern profile for the user account. Type of information derived included in the behavioral-pattern profile includes, but is not limited to, frequency of interaction with the user computing device, quickness of communication response, length of time utilizing various applications, number of unlocks of the user computing device, purchasing behaviors norms, durations of streaming via application(S) or internet, and other similar behavioral characteristics. In addition to providing the caregiver or parent with behavioral statistics of the monitored individual, the present invention allows for the identification of divergent actions. For this feature, each iteration of the overall process, the interactive activity data is statistically compared to the behavioral-pattern profile to identify an at least one divergent behavior during Step D, wherein the divergent behavior corresponds to specific activity data from the interactive activity data that is statistically offset from the behavioral-pattern profile by a preset degree. Examples of the divergent behavior includes, but is not limited to, change in volume and frequency of communication, change in communication with specific parties, lack of communication activity and posting, change of financial spending, change of social groups, and other similar changes; the parameters that define the divergent behavior may be altered and changed by the administrative account at any time to search for and identify different behaviors. Once the divergent behavior is identified, then behavioral contextual data associated with the specific activity data is extracted from the interactive activity data with the remote server. Additionally, a divergent behavior alert is sent to the administrative computing device to notify the caregiver or parent of abnormal behavior. For a comprehensive overview, the divergent behavior alert includes the specific activity data and the divergent behavior pattern. As a result, the caregiver or parent is able to adequately and efficiently respond and help the monitored individual. Additionally, for future analysis, the behavioral profile is updated with interactive activity data after Step D with the remote server.

Additionally, the present invention may utilize machine learning, artificial intelligence, and other algorithmic models to identify and label divergent behavior. In one embodiment, the present invention gathers information relating to divergent behavior from a plurality of monitored individuals and compiles a master list. The master list is then utilized to identify divergent behavior for each of the plurality of monitored individuals. In one embodiment, the present invention utilizes algorithmic models to collect surface samples of unseen before behaviors and provides said behaviors to the caregiver or parent to be classified as divergent or not. Resultantly, this provides an additional model to monitor for divergent behavior. In one embodiment, the caregiver or parent acts as a feedback entity to create a more comprehensive algorithmic model for identifying divergent behavior. In this embodiment, the caregiver or parent continuously enters new information that may be used to identify divergent behavior.

In one embodiment, the administrative account is granted access to the plurality of interactive activity data and the behavioral-pattern profile of the user account through the administrative computing device for personal analysis. This ensures that if the present invention misses a divergent behavior or additional information is needed for the caregiver or parent, the present invention provides a means for personal human review. If the user account is signed in and utilizing more than one computing device, the present invention allows the administrative account to view the monitored information from all of the computing devices. For this feature, the plurality of interactive activity data is organized based on a set of categories and select categories may be exported to the administrative computing device in response to a corresponding inquiry. Included in the plurality of interactive activity data is the user computing device statistics such as different application usage duration, user computing device locking statistic, frequency of input, and other similar information. The administrative account is provided with the plurality of interactive activity data and the behavioral-pattern profile for the user account and may review said information based on a variety of categories including audio data, video data, time frame, social media data, and any category preset by the present invention or defined by the administrative account.

Figure 14:
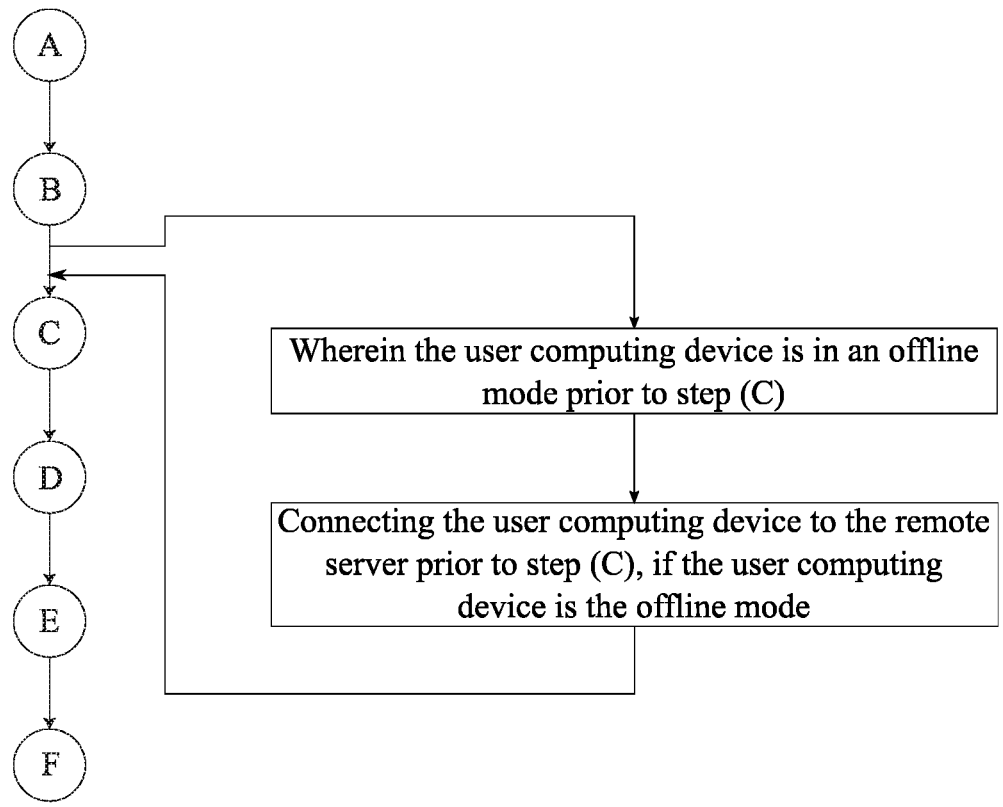
FIG. 14 is a flowchart depicting the subprocess for automatically connecting the user computing device, if the user computing device is in an offline mode.

It is preferred that the present invention is executed without the monitored individual's knowledge. In particular, Step C is executed as a background application on the user computing device. The present invention may be implemented as a hidden application or a hidden feature of the operating system of the user computing device to ensure that the monitored individual isn't hiding anything. Referring to FIG. 14, furthermore, in the case that the user computing device is in an offline mode prior to Step C, the present invention will automatically connect the user computing device to the remote server prior to Step C through the Internet or other means. In general, the prompts for the present invention are removed from the user computing device and further any visible trace of the present invention is removed and relegated to a background process within hidden folders or other masking means that render the present invention unavailable to the monitored individual, possibly through password protection protocols that are set during an installation process.

Another aspect that the present invention monitors for is other individuals using the user computing device. This is one of the at-risk behavior criterion and is identified through divergent actions and behaviors executed by an another individual. In one embodiment, the present invention is implemented on and by the user computing device and the administrator computing device.

Although the invention has been explained in relation to its preferred embodiment, it is to be understood that many other possible modifications and variations can be made without departing from the spirit and scope of the invention as hereinafter claimed.

What is claimed is:

1. A suicide and alarming behavior alert/prevention method comprising steps of:
   (A) providing a user account and at least one administrative account being managed by a remote server, wherein the user account is associated with a user computing device and a set of emergency contacts stored by the remote server, the administrative account is associate with an administrative computing device, the user computing device comprises a global positioning system (GPS) device;
   (B) providing risk-behavior criteria being associated with the user account, wherein the risk-behavior criteria comprise a plurality of at-risk geospatial boundaries;
   (C) monitoring the user computing device for interactive activity data with the remote server;
   recording a user location with the GPS device during step (C) as the interactive activity data;
   (D) parsing the interactive activity data with the remote server to identify at least one erratic behavior datum from the interactive activity data, wherein the erratic behavior datum meets at least one criterion from the risk-behavior criteria;
   designating the user location as the erratic behavior datum during step (D), if the user location is located within any from the plurality of at-risk geospatial boundaries;
   (E) extracting contextual data associated with the erratic behavior datum from the interactive activity data with the remote server, if the erratic behavior datum is identified during step (D); and
   (F) sending a notification alert from the remote server to the administrative computing device and to a specific group within the set of emergency contacts, wherein the notification alert comprises the erratic behavior datum and the contextual data associated with the erratic behavior datum, and the specific group is preset by the administrative account and is associated with a triggered behavior criterion.

2. The method as claimed in claim 1 comprising steps of:
   receiving the notification alert by the administrative computing device after step (F);
   prompting the administrative account to view the notification alert with the administrative computing device; and
   repeating step (F) until a read-receipt is received by the administrative computing device.

3. The method as claimed in claim 1, wherein the interactive activity data comprises at least one of the following: social network data, website browsing data, text messages data, audio data, call history data, video data, image data and geospatial location data.

4. The method as claimed in claim 1 comprising steps of:
   providing the user computing device comprising a microphone;
   providing the risk-behavior criteria comprising a dictionary of at-risk phrases-and-words;
   recording audio data during step (C) with the microphone;
   transcribing the audio data into text data with the user computing device;

designating the text data as interactive activity data during step (C);
parsing the text data to identify at least one matching primary entry from the dictionary of at-risk phrases-and-words during step (D), wherein the matching primary entry corresponds to a primary datum from the text data; and
designating the primary datum as the erratic behavior datum during step (D).

5. The method as claimed in claim 1 comprising steps of:
providing the user computing device comprising a user interface mechanism;
providing the risk-behavior criteria comprising a dictionary of at-risk phrases-and-words;
recording textual content data entered through the user interface mechanism with the user computing device during step (C);
designating the textual content data as interactive activity data during step (C);
parsing the textual content data to identify at least one secondary entry from the dictionary of at-risk phrases-and-words during step (D), wherein the matching secondary entry corresponds to a secondary datum from the textual content data; and
designating the secondary datum as the erratic behavior datum during step (D).

6. The method as claimed in claim 1 comprising steps of:
providing the risk-behavior criteria comprising a plurality of at-risk images;
rendering the interactive activity data comprising image data on the user computing device;
parsing the image data to identify at least one matching image from the plurality of at-risk images during step (D), wherein the matching image corresponds to a tertiary image datum from the image data; and
designating the tertiary image datum as the erratic behavior datum during step (D).

7. The method as claimed in claim 1 comprising steps of:
in response to the erratic behavior datum being identified during step (D),
receiving a connection request with the administrative computing device after step (F),
establishing a remote-control connection between the user computing device and the administrative computing device by the remote server,
pushing instructional commands from the administrative computing device to the user computing device through the remote server, and
executing the instructional commands with the user computing device.

8. The method as claimed in claim 1 comprising steps of:
providing a health-state assessment being managed by the remote server, wherein the health-state assessment comprises a plurality of possible test solutions, each of the plurality of possible test solutions is associated with a corresponding health-state;
receiving an assessment request from the administrative account with the administrative computing device;
prompting the user account to complete the health-state assessment with the user computing device;
receiving assessment answers with the user computing device;
comparing the assessment answers against each of the plurality of possible test solutions by the remote server to identify a closest solution from the plurality of possible test solutions; and
sending a health report to the administrative computing device, wherein the health report comprises the health-state assessment, the assessment answers, the closest solution, and the corresponding health-state associated with the closest solution.

9. The method as claimed in claim 8, wherein the health-state assessment is a mental-health assessment.

10. The method as claimed in claim 8, wherein the health-state assessment is a physical-health assessment.

11. The method as claimed in claim 1 comprising steps of:
providing the user account being associated with personal identification (ID) information;
searching the interactive activity data to identify at least one matching ID datum from the personal ID information data during step (C), wherein the matching ID datum corresponds to an ID datum from the interactive activity data; and
designating the ID datum as the erratic behavior datum during step (D).

12. The method as claimed in claim 1 comprising steps of:
providing a behavioral-pattern profile being associated with the user account;
statistically comparing the interactive activity data to the behavioral-pattern profile to identify at least one divergent behavior during step (D), wherein the divergent behavior corresponds to specific activity data from the interactive activity data that is statistically offset from the behavioral-pattern profile by a preset degree;
extracting behavioral contextual data associated with the specific activity data from the interactive activity data with the remote server;
sending a divergent behavior alert to the administrative computing device, wherein the divergent behavior alert comprises the specific activity data and the divergent behavior pattern; and
updating the behavioral profile with the interactive activity data after step (D) with the remote server.

13. The method as claimed in claim 12 comprising steps of:
repeating step (C) through step (F) to aggregating a plurality of interactive activity data;
storing the plurality of interactive activity data on the remote server; and
statistically analyze the plurality of interactive activity data by the remote server to generate a behavioral-pattern profile for the user account.

14. The method as claimed in claim 13, wherein the administrative account is granted access to the plurality of interactive activity data and the behavioral-pattern profile of the user account through the administrative computing device.

15. The method as claimed in claim 1 comprising steps of:
providing the risk-behavior criteria comprising a dictionary of socially-unhealthy behaviors, wherein each from the dictionary of socially-unhealthy behaviors comprises a plurality of unhealthy markers;
rendering the interactive activity data comprising social communication data;
parsing the social communication data to identify at least one matching unhealthy marker from the plurality of unhealthy markers during step (C), wherein the matching unhealthy marker corresponds to specific social data from the social communication data; and
designating the specific social data as the erratic behavior datum during step (D).

16. The method as claimed in claim 1, wherein the type of risk-behavior criteria comprises at least one of the following; suicide criterion, depression criterion, violence criterion, substance abuse criterion, gambling criterion, sexual activity criterion, and physical danger criterion.

17. The method as claimed in claim 1, wherein step (C) is executed as a background application on the user computing device.

18. The method as claimed in claim 1 comprising steps of:
rendering the user computing device being in an offline mode prior to step (C); and
connecting the user computing device to the remote server prior to step (C), if the user computing device is the offline mode.

* * * * *